Patented Aug. 22, 1944

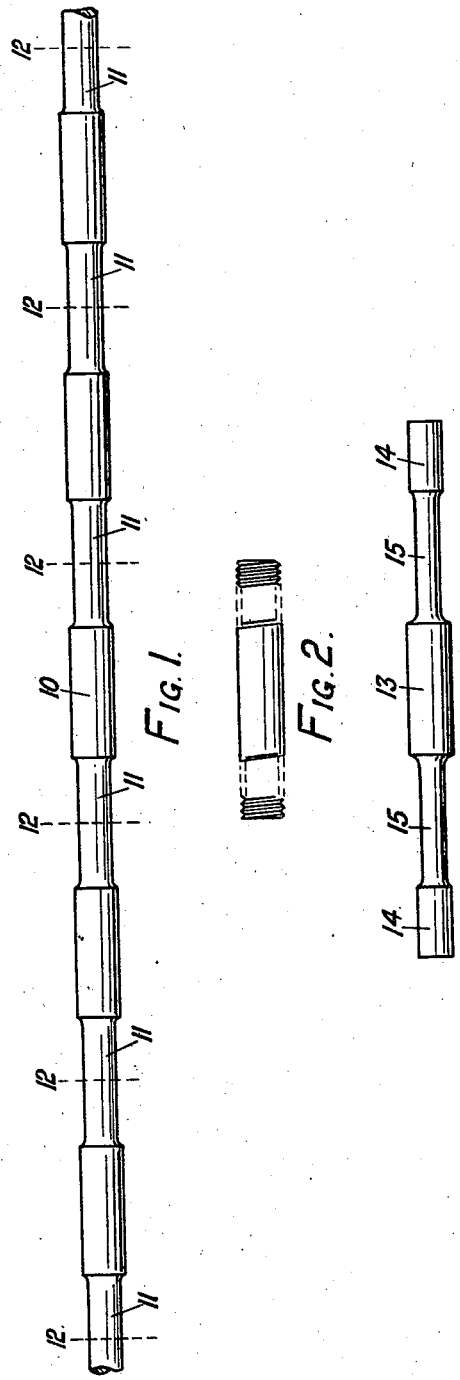

2,356,686

UNITED STATES PATENT OFFICE 2,356,686

MANUFACTURE OF STUD BOLTS

Archibald Park Newall, Glasgow, Scotland

Application April 6, 1943, Serial No. 481,973
In Great Britain February 6, 1943

1 Claim. (Cl. 10—27)

This invention relates to improvements in the manufacture of stud-bolts and has for objects to expedite production, to save metal, to eliminate machine turning operations hitherto usual, and also to form in the metal natural flow lines uninterrupted by tool marks which tend to form incipient fractures.

According to the invention cylindrical metallic bar stock of the requisite diameter is subjected to cold swaging circumferentially at points spaced apart along the length of the bar so as to form on the bar portions of less diameter than the original diameter of the bar, whereafter the bar is heat-treated and then swaged bolt-stud blanks are parted off from the bar, and screw-threads are formed on the swaged portions of the blanks by means of a screw-thread-rolling machine.

In order to form so called "waisted" stud-bolts, portions of the bar intermediate the parting-off portions aforesaid may be swaged to the required reduced "waisted" diameter.

It will be understood that such "waisting," i. e., local reduction of the shank to a diameter less than nominal diameter, materially strengthens the stud more especially in its resistance to fatigue.

A portion or portions of the bar intermediate the length of each stud-bolt blank may be left unswaged, i. e., left the full original diameter of the bar, so as to form a locating or "bearing" portion or portions on the body of the stud-bolt.

The invention is illustrated, by way of example, in the accompanying drawing in which Fig. 1 is an elevation showing a length of cylindrical metallic bar stock swaged at points spaced along its length and ready to be parted off into stud-bolt blanks. Fig. 2 is an elevation showing a finished stud-bolt. Fig. 3 is an elevation showing a modified form of stud-bolt blank.

Referring to the drawing, 10 denotes a cylindrical metallic bar which has been cold swaged circumferentially at points spaced along the length of the bar so as to form on the bar portions 11 of less diameter than the original diameter of the bar. The bar is parted off at the points 12 so as to produce stud-bolt blanks having swaged end portions 11 which are subsequently screw-threaded in a screw-thread-rolling machine. Fig. 2 shows a finished stud-bolt made from a blank from the bar 10.

The modified form of stud-bolt blank shown in Fig. 3 consists of an intermediate "locating" portion 13 of full bar diameter, swaged reduced diameter end portions 14 on which screw-threads are to be rolled, and swaged reduced diameter "waist" portions 15 between the portions 13 and the end portions 14.

The bar is inter-stage annealed or otherwise heat-treated, i. e., after the swaging operation but before the parting-off and roll-threading operations.

I claim:

The method of manufacturing stud-bolts from cylindrical metallic bar stock which comprises cold swaging the bar circumferentially at points spaced apart along the length of the bar so as to form on the bar portions of less diameter than the original diameter of the bar, parting off swaged stud-bolt blanks from the bar, and rolling screw threads on swaged portions of the blanks, the portions of the bar from which the stud-bolt blanks are formed being heat treated prior to the thread-rolling operation.

ARCHIBALD PARK NEWALL.